(12) United States Patent
Dahl et al.

(10) Patent No.: US 10,425,367 B2
(45) Date of Patent: Sep. 24, 2019

(54) AUTOMATED CREATION OF A PUBLICATION VIA CAPTURED SOCIAL MEDIA INTERACTIONS

(71) Applicant: CBS Interactive Inc., San Francisco, CA (US)

(72) Inventors: Eric Robert Dahl, Oakland, CA (US); Ka Yan Samatha Tong, Hong Kong (HK); Tan Duc Nguyen, Milpitas, CA (US)

(73) Assignee: CBS Interactive Inc., San Francisco, CA (US)

( * ) Notice: Subject to any disclaimer, the term of this patent is extended or adjusted under 35 U.S.C. 154(b) by 290 days.

(21) Appl. No.: 15/430,257

(22) Filed: Feb. 10, 2017

(65) Prior Publication Data
US 2017/0250938 A1 Aug. 31, 2017

Related U.S. Application Data

(60) Provisional application No. 62/300,642, filed on Feb. 26, 2016.

(51) Int. Cl.
*H04L 12/58* (2006.01)
*H04L 29/06* (2006.01)
*H04L 29/08* (2006.01)
*G06F 17/21* (2006.01)

(52) U.S. Cl.
CPC .......... *H04L 51/18* (2013.01); *G06F 17/218* (2013.01); *H04L 51/02* (2013.01); *H04L 51/16* (2013.01); *H04L 63/101* (2013.01); *H04L 67/22* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 2007/0106627 A1* | 5/2007 | Srivastava | G06Q 10/10 706/20 |
| 2010/0293560 A1* | 11/2010 | Bland | H04L 51/02 719/328 |
| 2012/0096046 A1* | 4/2012 | Kucera | G06Q 30/01 707/802 |
| 2012/0284290 A1* | 11/2012 | Keebler | G06F 16/958 707/756 |
| 2015/0242374 A1* | 8/2015 | Kong | G06F 17/212 715/201 |
| 2015/0350349 A1* | 12/2015 | Kao | H04L 67/18 709/204 |

* cited by examiner

*Primary Examiner* — Mohamed A. Wasel
*Assistant Examiner* — Tsung Y Wu
(74) *Attorney, Agent, or Firm* — Fenwick & West LLP

(57) ABSTRACT

A content management server monitors activity on a social networking system originating from an authorized user account. The server detects a post by the account that contains a predefined trigger tag. The server creates a story record in a web publishing application on the server responsive to detecting the post containing the predefined trigger tag. The server automatically generates a direct messaging conversation to populate additional fields of the story record. The server detects a closing inbound direct message from the account containing a publish tag, and responsive to detecting the closing inbound direct message, automatically publishes the story record.

20 Claims, 6 Drawing Sheets

AUTOMATED CREATION OF A PUBLICATION VIA CAPTURED SOCIAL MEDIA INTERACTIONS

RELATED APPLICATIONS

This application claims the benefit of U.S. Provisional Application No. 62/300,642 filed on Feb. 26, 2016, which is incorporated by reference herein.

BACKGROUND

1. Field of Art

The disclosure generally relates to a content management system, and more particularly to automating the publication of stories online.

2. Description of the Related Art

In a conventional content management system, reporters compose stories using a platform (i.e., a website) provided and maintained by the content management system. A reporter identifies his/her identity by logging into the platform. The reporter creates a story by filling in various predefined fields with information related to the story such as title and body. The reporter fills out additional metadata such as headline, sub-headline, images, animations, videos, video thumbnail, hyperlinks, etc.

In recent years, reporters have turned to social media as an additional platform for reaching an audience with a breaking a news story. Social media beneficially enables a reporter to quickly post a breaking story and instantly alert followers to the post. However, social media is often limited in the length and type of digital content that can be posted, and therefore does not provide a substitute for the platform maintained and provided by the content management system. As a result, reporters often find themselves juggling both platforms in an effort to reach the widest audience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
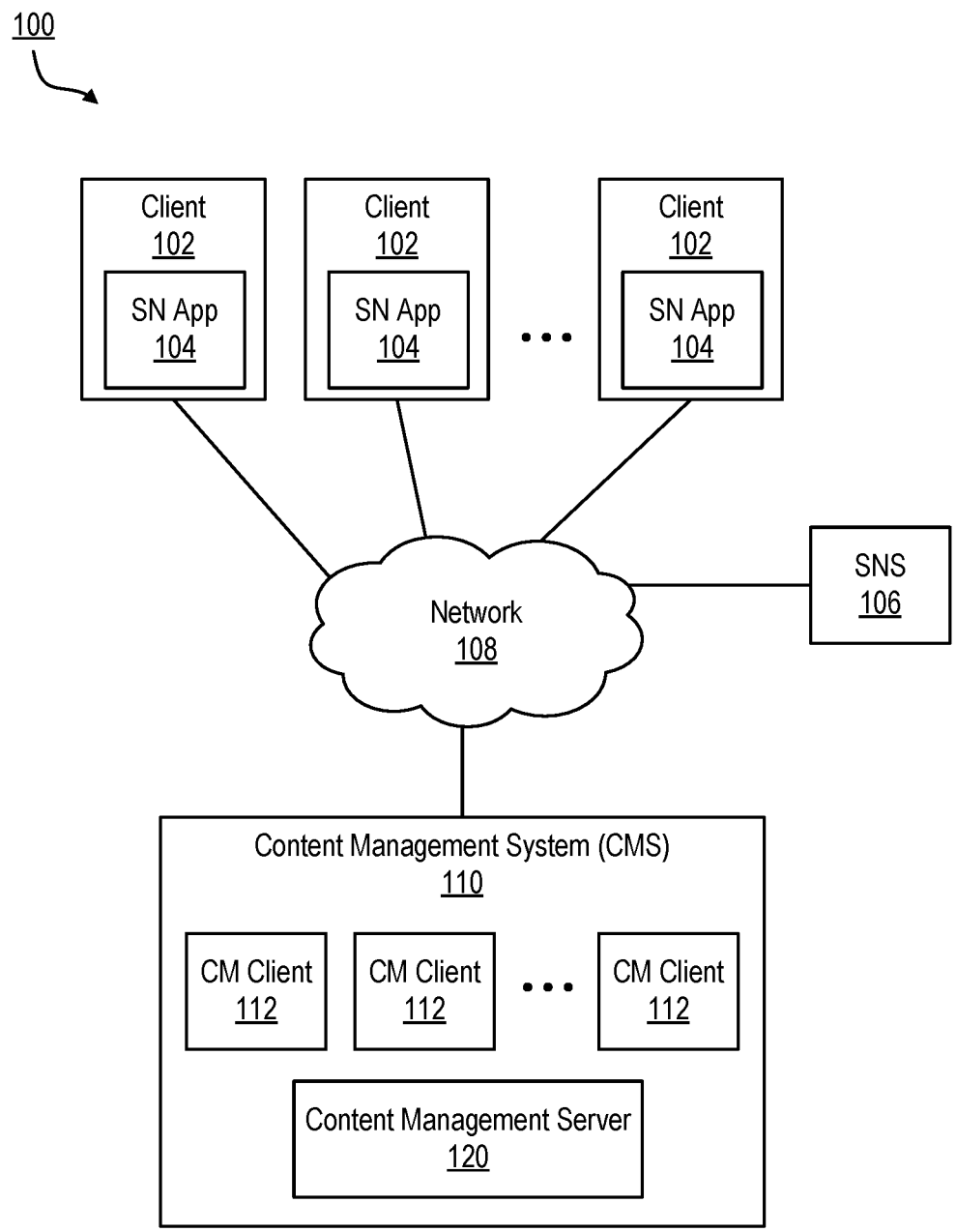
FIG. 1 illustrates a digital publishing environment for creating and publishing news story records, according to one embodiment.

The Figures (FIGS.) and the following description relate to various embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A content management system automatically interfaces with a social media platform to enable reporters to use a social media application not only to report breaking news directly through a social media channel but also to control the content management system to generate and publish a story on a traditional website. Beneficially, the reporter can reach both social media audiences and traditional web-based audiences without ever leaving the social media application and without having to navigate between the social media application and a traditional publishing platform. This enables the reporter to quickly and efficiently break a news story both to social media and to a traditional news website. For example, in one embodiment, the reporter submits a post using his/her social media user profile to break a news story, and includes one or more predefined tagging elements in the breaking news post. The content management system operates as a follower to the report's user profile, detects the breaking news post with the predefined tag, and through a direct messaging exchange or other communications available within the social media application, obtains additional tagged content from the reporter that the content management system automatically detects, parses, and publishes to a traditional website.

In a particular embodiment, a content management system creates and publishes a story record through a computer-implemented method or according to instructions on a non-transitory computer-readable storage medium. A content management server monitors activity of a social networking system originating from an authorized user account. The content management server detects an original post by the authorized user account to the social networking system that contains a predefined trigger tag. A new story record is created in a web publishing application on the content management server responsive to detecting the post containing the predefined trigger tag. An outbound direct message is automatically generated to the authorized user account via the social networking system. A first inbound direct message is detected from the authorized user account via the social networking system in response to the outbound direct message. The first inbound direct message contains at least one field identifier tag and text associated with the field identifier tag. A field associated with the field identifier tag in the story record is automatically populated with the text associated with the first field identifier tag in the first inbound direct message. A closing inbound direct message is detected from the authorized user account via the social networking system. The closing inbound direct message contains a publish instructions tag. The story record is automatically published to a website responsive to detecting the closing inbound direct message.

Digital Publishing Environment

FIG. 1 illustrates a digital publishing environment 100 for creating and publishing story records, according to one embodiment. The digital publishing environment 100 includes clients 102, a social networking system (SNS) 106, and a content management system (CMS) 110. Each of these entities includes computing devices that may be physically remote from each other but which are communicatively coupled by a computer network 108.

The network 108 enables communications among the entities connected to it through one or more local-area networks and/or wide-area networks. In one embodiment, the network 108 includes the Internet and uses standard wired and/or wireless communications technologies and/or protocols. The network 108 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. In another embodiment, the entities use custom and/or dedicated data communications technologies instead of, or in addition to, the ones described above. Although one instance of the network 110 is shown, multiple networks may be present.

The SNS 106 provides a social networking platform accessible by other entities (e.g., content management system 110 and clients 102) via the network to provide social networking services and functionalities. The SNS 106 can include one or more computing devices storing a social networking database that stores records for a plurality of users of the social network and providing users with the ability to communicate and interact with other users. According to various embodiments, the SNS 106 may include a website or a server accessed via the network 108.

The SNS 106 stores user profiles associated with a plurality of users, for example, in a user profile store (not shown) that identifies each user by a unique identifier. The user profiles each comprise a data structure that includes declarative information about a user. The user profiles may include information explicitly shared by the users such as biographic and demographic data, behavioral data, and other social data. Biographic and demographic data can include data about a user, such as age, gender, location, interests, affinities, etc. Behavioral data can include information about a user such as the user's activities within the SNS 106, such as specific actions (posts, likes, comments, etc.), activity levels, usage statistics, etc.

Each user profile may be associated with a unique profile page in the form of a website (viewable via the SN app 104 or web browser on a client 102) associated with the user that may provide the biographical information about the user and content posted or shared by the user including text, images, video, audio, files, or other content. In some instances, users may post or share content on other user's profile pages.

The SNS 106 manages connections between the users (e.g., by storing an association between respective user identifiers of the users). In one embodiment, the SNS 106 may enable a user to establish a unidirectional connection with another user, known as "subscribing to" or "following" the other user. In one embodiment, the SNS 106 may require the followed user to consent to the connection while in other embodiments, no consent is required. With a unidirectional connection, a user A may "follow" a user B without the user B necessarily following the user A. In another embodiment, the SNS 106 may enforce bidirectional connections between users in which a connection is established only with mutual consent from both users. Establishing this bidirectional connection may be referred to as "friending" and the users become linked as "friends" in the SNS 106. The connections may be stored in a data structure at the SNS 106 as a social graph or using a relational database.

The SNS 106 enables a given user to access profile pages including posts, shares, or other content originating from the users connected with the given user. In contrast, the SNS 106 may keep profile pages, posts, shares, or some portion thereof inaccessible to unconnected users. The content associated with each user may be organized on the user's profile page as an activity stream that may include, for example, a plurality of posts organized chronologically.

Furthermore, a user-specific feed for a given user may include posts, shares, or other content originating from the users connected with the given user. The user can thus view activity of connected users in one place, without navigating to profile pages of individual users. Further still, the SNS 106 may enable a user to automatically get alerts when a connected user posts new content to the SNS 106.

The posts can include text and/or one or more tags. A tag is an indicator comprising actual text or metadata that acts as a label for other identified text that may form part of the same post. For example, a tag could be a symbol (e.g., "#") followed by a relevant keyword or phrase, often with no character (i.e., space) break there between. In another embodiment, a tag may be embodied as metadata associated with the text, but the tag itself is not necessarily visible as part of the post as additional text. The tag categorizes the post and can be used as a mechanism to enable automated searching, indexing, or identification of posts. The activity stream of the user is available to other users that have established a connection with the user.

The SNS 106 also may provide a platform to enable direct communications between users. In one embodiment, users can communicate with each other through the SNS 106 via direct messages using, for example, a direct messaging interface. A direct message is a message that explicitly identifies one or more recipients. For example, a message from user A that is explicitly directed towards another user B is considered a direct message from user A to user B. Unlike posts, which may be available to the public or to all of the user's followers or friends, a direct message may be considered "private" and can be accessed only by the one or more explicitly identified recipients. In one embodiment, the SNS 106 may provide an alert when a direct message is received by a user.

The SNS 106 may include an application programming interface (API) that enables user posts, alerts, direct messages, and other information to be accessed in an automated way without requiring manual selections by a human user. For example, a client application executing on a computing device may interact with the SNS 106 via the API to perform the same or similar tasks that a user performs using the SNS 106. In this way, the client application can operate as a "user" of the SNS 106, and may establish a user profile, establish connections with other users, and access and send posts, alerts, direct messages, and other information via the SNS 106.

Examples of an SNS 106 can include, for example, the systems operated by TWITTER, FACEBOOK, LINKEDIN, GOOGLE+, INSTAGRAM, PINTEREST, etc.

The clients 102 are generally any devices capable of receiving and presenting digital content. Example clients 102 include display platforms such as computers (e.g., personal computers, laptops, smart televisions), tablets (e.g., touch-screen devices), and mobile devices (e.g., cell phones, smart phones, personal digital assistants, smart watches, eye-mounted devices, or head-mounted devices). Different clients 102 may be associated with different device types (e.g., computers, tablets, or mobiles) based on the hardware components of the display platforms (e.g., the display size, the display aspect ratio, associated user input devices, etc.) as well as the software components of the display platforms (e.g., operating system, browser program, native applications, etc.). Although only three clients 102 are shown, any number of clients 102 can be present.

The clients 102 include social networking (SN) applications 104 that interface with the SNS 106 via the network 108. The SN applications 104 execute on the clients 102 to interface with users of the clients 102 by receiving user inputs and displaying digital content to the users. Receiving user input can include, for example, receiving a request from a user of a client 102 to subscribe to another user of another client 102 and receiving text to include in a post. Displaying digital content can include, for example, displaying a news feed and a direct messaging interface. For example, the SN applications 104 display digital content received from the SNS 106. The SN applications 104 receive and transmit data via the network 108. The SN applications 104 store and obtain user identifiers for the users of the clients 102. The user identifiers uniquely identify the users of the clients 102 the SN applications 104 are executed on. Furthermore, the user identifiers associate the users of the clients 102 to user profiles at the SNS 106, described in more detail below. The SN applications 104 include the user identifiers in communications to the SNS 106. The clients 102 display digital content received by the SN applications 104 from the SNS 106 for viewing by the users of the clients 102.

The CMS 110 is a platform for creating and publishing story records. The CMS 110 comprises a content management (CM) server 120 and a plurality of CM clients 112. The CM clients 112 are computing devices to enable users having authorized user accounts to access the CMS 110. The CM clients 112 are authorized to provide or edit digital content to be included in story records. Although only three CM clients 112 are shown, any number of CM clients 112 may be present.

The CM server 120 provides a platform to enable users of the CM client 112 to create, store, and publish story records to a website. Example story records may have subject matter including news, sports, science, technology, videogames, music, song lyrics, movies, and television. To create a story a record, an authorized user of a CM client 112 may access the CM server 120 and use the interfaces available on the CM server 120 to create, store, and publish a story.

The CM server 120 may also operate as a "user" of the SNS 106 as will be described in further detail below. Particularly, the user account associated with the CM server 120 may be configured such that it is connected with (and can therefore view posts and see direct messages from) the authorized users of the CM clients 112 that are authorized to use the CM server 120 to create and publish story records. Thus, the CM server 120 follows via the SNS 106, accounts associated with the same individuals that are authorized users of the CM server 120. In this way, the authorized users of the CM server 120 may communicate with the CM server 120 from clients 102 via interactions with the SNS 106. The CM server 120 may then identify and process these communications detected via the SNS 106 to automatically create and publish story records without direct interaction by the reporter with the CM client 112. Beneficially, a reporter can create and publish a story using a client 102 and SN app 104 via communications over the SNS 106 without having the use the CM clients 112 to directly access the CM server 120. This enables the reporter to simultaneously post to social media and automatically generate a story for publishing to a web site all through the social media application 104.

Figure 2:
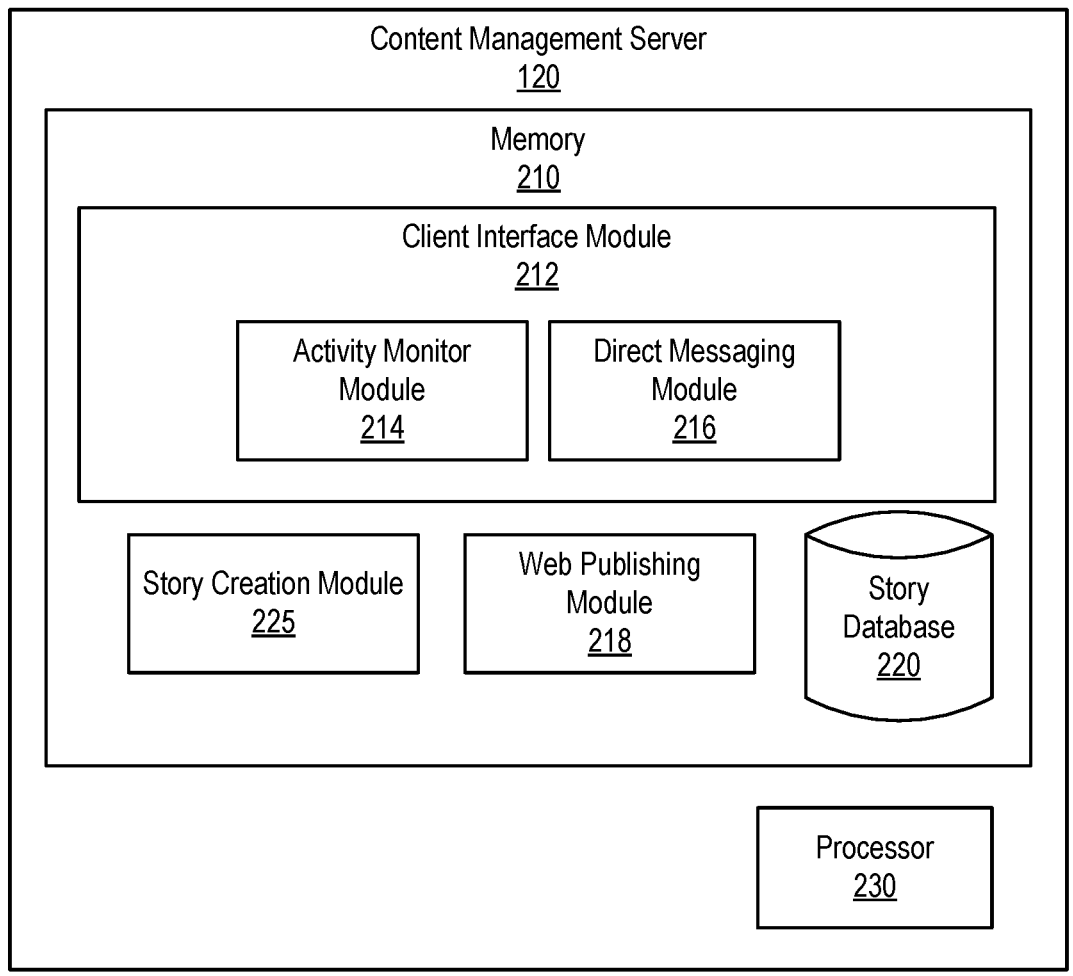
FIG. 2 illustrates a content management server, according to one embodiment.

FIG. 2 illustrates an example embodiment of a content management (CM) server 120, according to one embodiment. The CM server 120 may be embodied, for example, as one or more servers operating in a content management system (CMS) 110. In the illustrated embodiment, the CM server 120 includes a memory 210 and one or more processors 230. The memory 210 includes modules such as client interface module 212, story creation module, web publishing module 218 and databases, such as story database 220. One configuration of modules is shown, consistent with one embodiment, but alternative embodiments may contain fewer, additional, or different modules configured to perform similar functionality. The modules may be embodied as instructions stored to a non-transitory computer-readable storage medium such as the memory 210. The instructions when executed by the processor 230 carry out the attributed functionality of the modules as described herein.

The story creation module 225 provides an interface for creating and storing story records to a story database 220. Each story record comprises digital content organized into a plurality of different fields that each represents a different portion of the story. For example, fields may include a title field, a headline field, a sub-headline field, an author field, a summary field, a dek field, main text or body field, a timestamp field, an images field, an animations field, a videos field, a video thumbnail field, and/or a hyperlinks field. Digital content may include, for example, text, images, animations, videos, digital audio files, captions, or a combination thereof. Digital content may also include references (e.g., a link or an address) to other digital content. To create a story record, a user may access the CM server 120 via a CM client 112 and fill in the various fields. The records are stored to the story database 220. The story creation module 225 then enables the user to store the story record and to publish the story record via the web publishing module 218. Upon publication, the web publishing module 218 formats the field data in the story record into a format suitable for digital publication (e.g., via a web site).

The client interface module 212 may comprise an API for interfacing with the SNS 106. As described previously, a user account on the SNS 106 may be associated with the CM server 120 and may establish connections to other users. The CM server 120 may then interact with the SNS 106 via the API. Particularly, an activity monitor module 214 may automatically monitor posts, direct messages, alerts, or other information from a predefined list of authorized users (e.g., users connected to the CM server account via the SNS 106). The activity monitor 214 then applies a set of rules to the observed content in order to automatically generate a story record in a form compatible with the CM server 120. For example, the activity monitor 214 parses posts from its connected users and determines whether the posts contain any tags matching a predefined trigger tag. The activity monitor module 214 causes the story creation module 225 to automatically create a new story record responsive to at least one of the tags of the post matching the predefined trigger tag (e.g., "#BN"). When creating the story record, the activity monitor module 214 may also cause the story creation module 225 to automatically populate a title field of the story record with content of the post and automatically populate an author field of the story record with a name associated with the user profile from which the post containing the tag originated. Once a story record is created, additional posts may contain other predefined field identifier tags associated with other predefined story record fields and associated text to enable the author to populate additional fields of the story records. Here, text associated with the field identifier tag may include, for example, text between the tag and a predefined end-of-message symbol (e.g., a "."). Alternatively, the text for populating the field may include all of the text in the post other than the tag itself and does not necessarily fall before or after the tag. For example, if the client interface module 212 detects a post from the user including field identifier tag "#title" and text "Royals Win 2015 World Series," the client interface module 212 automatically populates or updates title field of the story with the text "Royals Win 2015 World Series." If a post with a predefined field identifier tag is detected for a field that is already populated, the CM server 110 may automatically replace the existing text with the text of the new post.

In one embodiment, fields of the story record may also be populated or edited via direct messaging instead of posting. For example, in one embodiment, the direct messaging module 216 may automatically engage in a direct messaging conversation with the SNS 106 when the trigger tag to create the new story record is detected from a connected user. The direct messaging module 216 may initiate the direct messaging conversation by automatically generating an outbound direct message in response to detecting the trigger tag. Alternatively, the direct messaging module 2016 may detect when the connected user initiates the direct messaging conversation via an incoming message. The direct messaging module 216 parses inbound direct messages from the user and identifies field identifier tags in the message and text associated with the field identifier tags. The direct messaging module 216 automatically populates the fields of the story record associated with the field identifier tags with the text associated with the field identifier tags in the direct messages. Alternatively, if the field is already populated with text, the direct messaging module 216 may automatically replace the text with the new text. In this manner, the direct messaging module 216 automatically updates the story record at the story database 220 via only interacts through the SNS 106.

Table 1 includes an example list of field identifier tags and actions the client interface module 212 may detect and the actions performed in response to the detection.

TABLE 1

| | |
|---|---|
| #title | Replace title field |
| #headline | Replace headline field |
| #sub-headline | Replace sub-headline field |
| #author | Replace author field |
| #summary | Replace summary field |
| #dek | Replace dek field |
| #body | Replace body field |
| #timestamp | Replace timestamp field |
| #image | Replace image field |
| #animation | Replace animation field |
| #video | Replace video field |
| #append | Append end of body field |
| #edit | Send news story record to editors for review |
| #publish | Publish news story record |

In one embodiment, additional tags may be used to instruct the story creation module 225 to create or update a layout of the digital publication. A layout defines a spatial arrangement of the fields of the story record included in the digital publication. For example, a layout may specify the width, height, and spatial location of different sections of the digital publication in which different fields of the story record may be displayed.

In other embodiment, certain predefined tags may be used to enable users to edit, delete, or update the news story records stored in the story database 220 via posts or direct messaging after it is published.

The web publishing module 218 publishes a story record stored in the story database 220 (e.g., responsive to the direct messaging module 216 detecting an inbound direct message or post containing a publish instruction tag) as a digital publication. For example, the web publishing module 218 encodes the various fields in a format suitable for publication (e.g., in an HTML format). The web publishing module 218 may cause various fields to be formatted according to certain predefined formatting rules and in certain predefined spatial positions within the digital publication. For example, a "title" field may be position at the top of the page and have large font, a picture field may be positioned below the "title" field, the body field may be positioned below the title and picture, etc. In one example, the digital publication is a website. The web publishing module 218 allows users of the clients 102 to access the digital publication via the network 108.

The processor 230 may be any general-purpose processor (e.g., a central processing unit (CPU), a graphics processing unit (GPU), a digital signal processor (DSP), one or more application specific integrated circuits (ASICs), one or more radio-frequency integrated circuits (RFICs), or any combination of these). The processor 130 is configurable to execute instructions corresponding to the processes described herein.

The memory 210 may be, for example, firmware, read-only memory (ROM), non-volatile random access memory (NVRAM), and/or RAM. The memory 210 can include a storage device such as a hard disk drive or any other device capable of storing data, including a writeable compact disk (CD), or a solid-state memory device. The memory 210 is configured to store instructions and data that can be executed by the processor 230. The instructions (e.g., software or program code) may also reside, completely or at least partially, within the memory 210 or within the processor 230 (e.g., within a processor's cache memory) during execution thereof. The memory 210 may include any machine-readable medium. The term "machine-readable medium" should be taken to include a single medium or multiple media (e.g., a centralized or distributed database, or associated caches and servers) able to store computer-readable instructions (or software or program code). The term "machine-readable medium" includes, without limitation, data repositories in the form of solid-state memories, optical media, and magnetic media.

Creating and Publishing a Story Record

Figure 3:
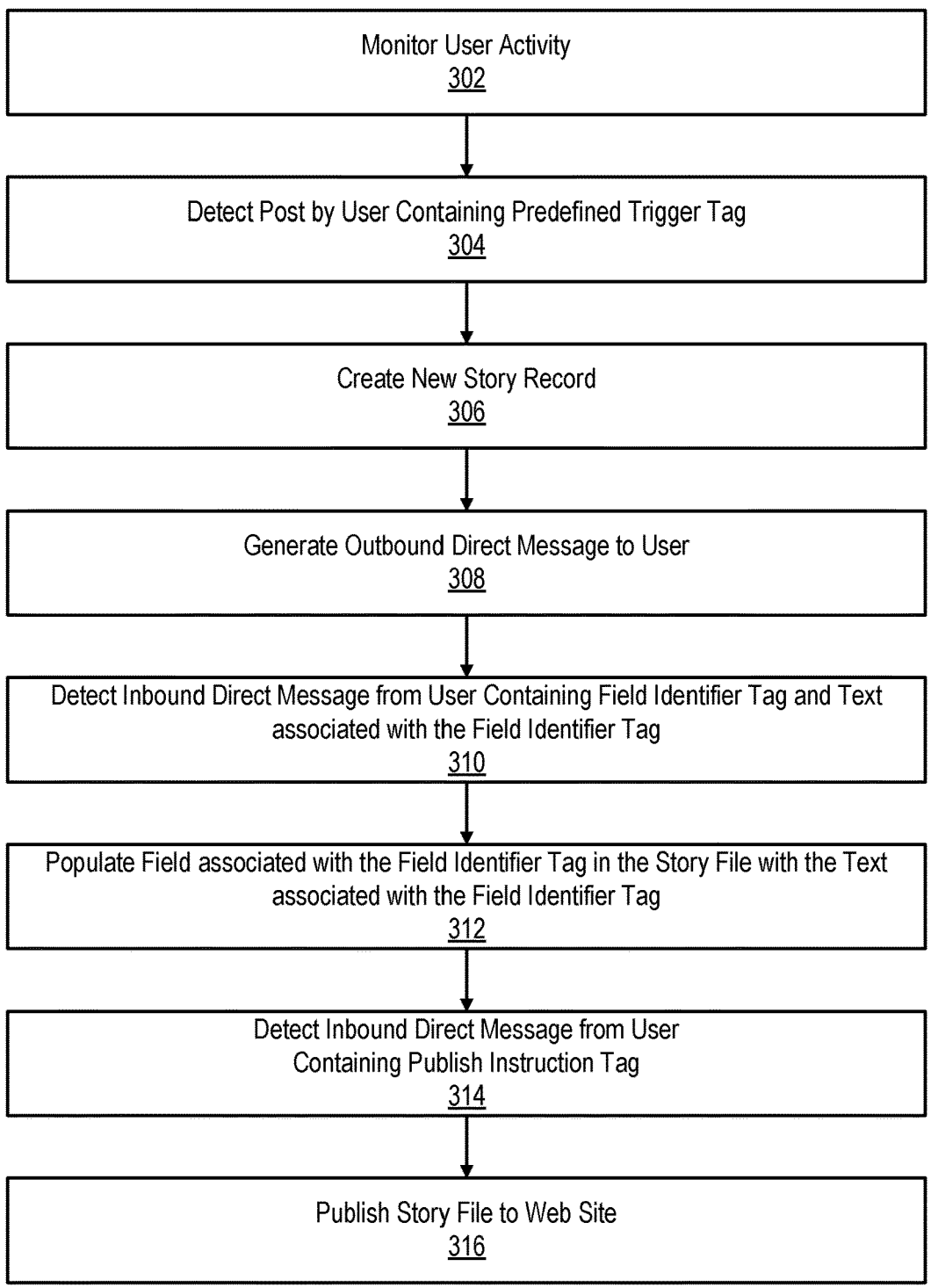
FIG. 3 illustrates a flow chart of an example method for creating and publishing a story record, according to one embodiment.

FIG. 3 illustrates a flow chart of an example method for creating and publishing a story record, according to one embodiment.

The activity monitor 214 of the content management server 120 monitors 302 social networking activity on the SNS originating from users of the SNS 106 connected with the CMS 110. The activity monitor 214 detects 304 a post from one of the monitored users containing a predefined trigger tag. The activity monitor 214 creates 306 a new story record in the story database 220 responsive to detecting the post containing the predefined trigger tag.

The direct messaging module 216 automatically generates 308 an outbound direct message via the SNS 106 directed to the user that made the post. The direct messaging module 216 detects 310 inbound direct messages from the user via the SNS 106 that includes one or more field identifier tags and text associated with each of the one or more field identifier tags. The direct messaging module 216 parses the inbound direct messages and automatically populates 312 the fields of the story record associated with the field identifier tags of the inbound direct messages with the text associated with the field identifier tags of the respective inbound direct messages. The direct messaging module 216 detects 314 an inbound direct message from the user containing a predefined publish instruction tag. In response to detecting the publish instruction tag, the web publishing module 218 publishes 316 the story record to a website.

Creating and Publishing a Story Record—Example

Figure 4:
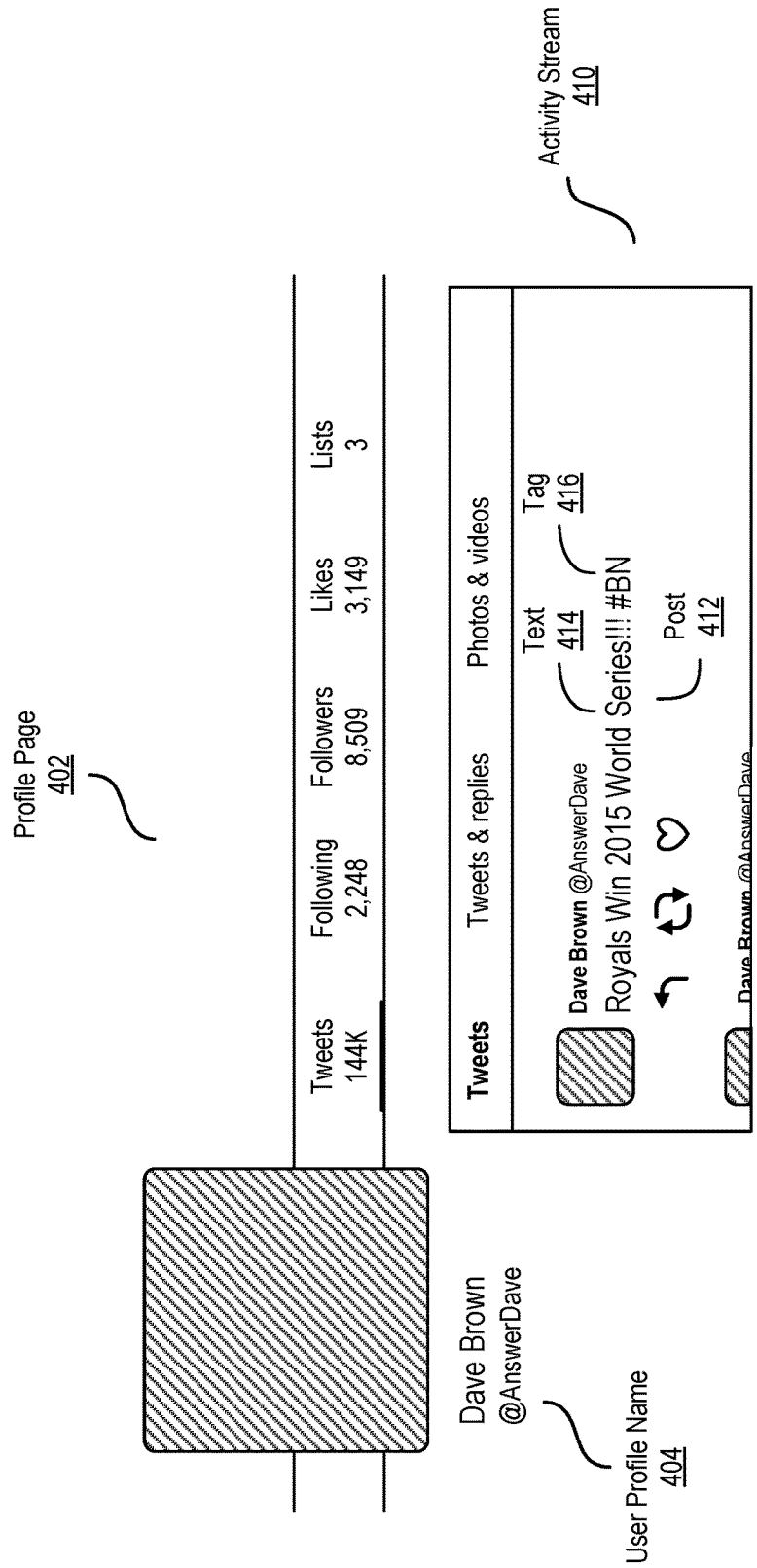
FIG. 4 illustrates a profile page of a user profile at a social networking system, according to one embodiment.

FIG. 4 illustrates a user profile page 402 associated with a user profile at the SNS 106, according to one embodiment. In this example, the user profile at the SNS 106 corresponds to a user authorized to access the CM server 110. The profile page 402 can include a user profile name 404 and an activity stream 410. The profile page 402 can additional elements such as a user profile image, declarative information, and general statistics.

The user profile name 404 identifies a user associated with the profile page 402. The profile name 404 includes the user's a first name and a last name (e.g., "Dave Brown"). The profile name 404 can further include a user handle (e.g., "@AnswerDave") of the user further identifying the user associated with the profile page 402.

The activity stream 410 includes activity originating from the user associated with the profile page 402. The activity stream 410 includes, for example, a plurality of posts. A post (e.g., post 412) is a message by the user (e.g., "Dave Brown") associated with the profile page 402 to followers of the user. The plurality of posts in the activity stream 410 can be considered "public" messages as all followers of the user can view, reply-to, repost, like, etc. the posts in the activity stream 410 of the user associated with the profile page 402.

The activity stream 410 includes a post 412 by the user associated with the profile page 402. The post 412 (e.g., "Royals Win 2015 World Series!!! #BN) includes text 414 (e.g., "Royals Win 2015 World Series!!!) and a tag 416 ("#BN").

In this example, the activity monitor module 214 monitors the activity stream 410 originating from the user profile at the SNS 106 associated with the profile page 402. The activity monitor module 214 determines the post 412 contains a tag 416 and further determines the tag 416 matches a predefined trigger tag (e.g., "#BN"). The activity monitor 214 creates a story record and automatically populates a title field of the news story record with the text 414 (e.g., "Royals Win 2015 World Series!!!") of the post 412 and automatically populates an author field with the user profile name 404 (e.g., "Dave Brown").

Figure 5:
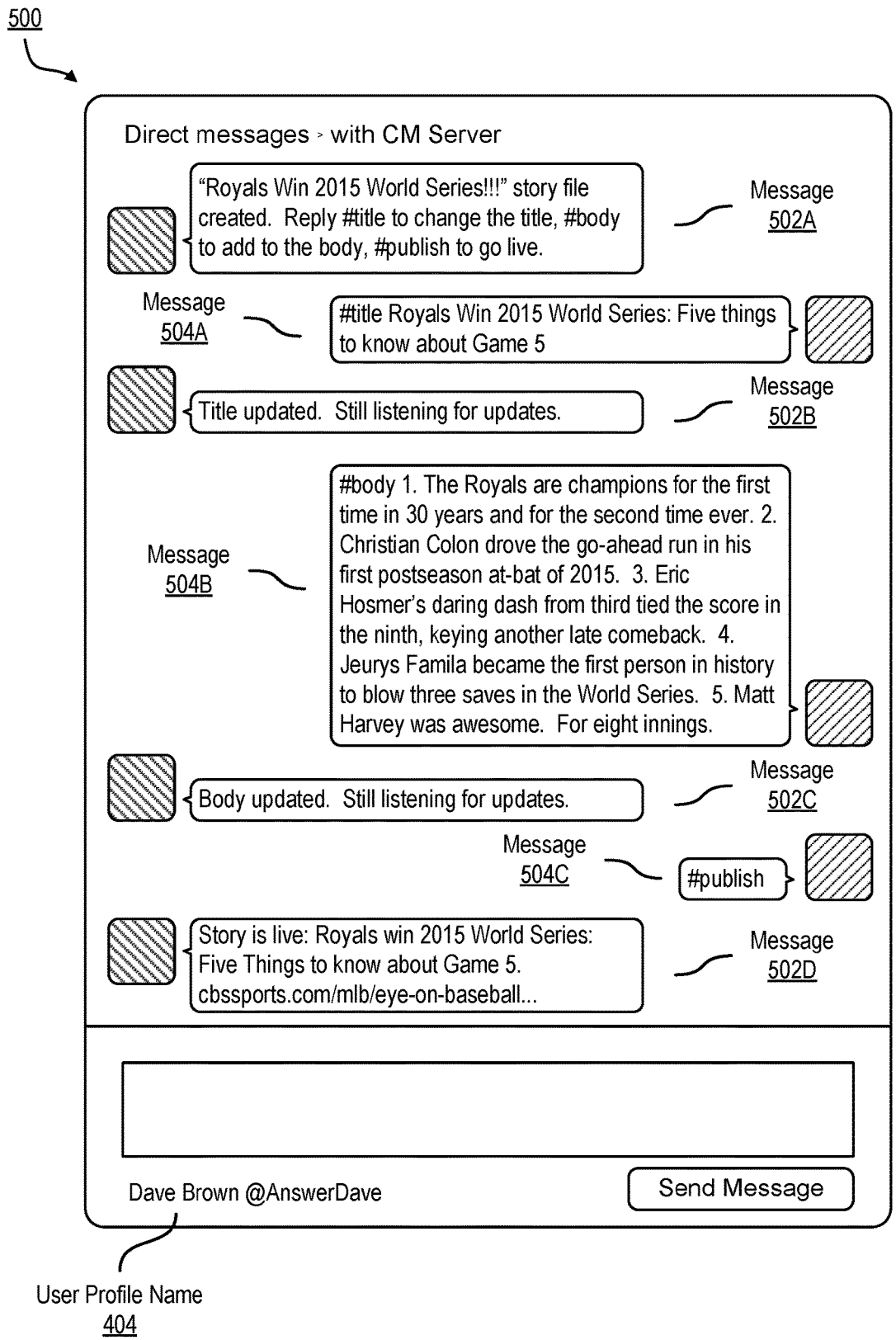
FIG. 5 illustrates a direct message dialog box, according to one embodiment.

FIG. 5 illustrates a direct message dialog box 500, according to one embodiment. The direct message dialog box 500 illustrates an example direct messaging conversation between the user associated with the profile page 402 and the CM server 120.

The direct messaging conversation includes example messages 502A through 502D and 504A through 504C. The messages 502A through 502D (hereinafter collectively referred to as "CM server messages 502") originate from and are automatically generated by the CM server 120. The CM server messages 502 are considered outbound direct messages from the perspective of the CM server 120 and are considered inbound messages from the perspective of the user associated with the profile page 402. Similarly, the messages 504A through 504C (hereinafter collectively referred to as "user messages 504") originate from the user associated with the profile page 402. The user messages 504 are considered outbound messages from the perspective of the user associated with the profile page 402 and are considered inbound messages from the perspective of the CM server 120. The following discussion will be from the perspective of the CM server 120.

The direct messaging module 216 initiates the direct messaging conversation illustrated in the dialog box 500 by automatically generating a first outbound message 502A. The message 502A indicates to the user that the CM server 120 created a news story record and automatically populated the title field of the story record with the text 414 of the post 412. The message 502A includes identifier tags acceptable by the direct messaging module 216 and a brief description of the identifier tags. Particularly, the message 502A provides instructions to the user associated with the profile page 402 to respond to the message 502A with a title identifier tag (e.g., "#title") to edit the title field of the story record, to respond with a body identifier tag (e.g., "#body") to edit a body field of the story record, or to respond with a publish instruction tag (e.g., "#publish") to publish the story record. The message 502A can include fewer or additional identifier tags and brief descriptions thereof. In one embodiment, direct messaging module 216 provides the user associated with the profile page 402 with a list of identifier tags that can be used in a direct messaging conversation to modify various fields of the story record. In this embodiment, the user can respond the message 502A with any identifier tag from the list of identifier tags and is not limited to responding with the identifier tags indicated in the message 502A.

The direct messaging module 216 detects a first inbound message 504A from the user associated with the profile page 402. The message 504A includes a title identifier tag (e.g., "#title") and associated text (e.g., "Royals Win 2015 World Series: Five things to know about Game 5"). The direct messaging module 216 automatically edits the title field of the story record with the associated text of the message 504A. The direct messaging module 216 automatically generates a second outbound message 502B indicating to the user that the CM server 120 updated the title field of the story record and that the direct messaging module 216 is listening/waiting for updates.

The direct messaging module 216 detects a second inbound message 504B from the user associated with the profile page 402. The message 504B includes a body identifier tag (e.g., "#body") and associated text (e.g., "1. The Royals are champions . . . "). The direct messaging module 216 automatically populates the body field of the story record with the associated text of the message 504B. The direct messaging module 216 automatically generates a third outbound message 502C indicating to the user that the CM server 120 updated the body field of the story and that the direct messaging module 216 is listening/waiting for updates.

The direct messaging module 216 detects a third inbound message 504C from the user associated with the profile page 402. The message 504C includes a publish instruction tag (e.g., "#publish"). The direct messaging module 216 edits a timestamp field of the story record to include a time the direct messaging module 216 detected the message 504. The web publishing module 218 publishes the story record stored in the story database related to the topic of the direct messaging conversation between the CM server 120 and the user associated with the profile page 402. The web publishing module 218 publishes the story record in a digital publication, for example a website. The web publishing module 218 generates a link to the website. The direct messaging module 216 automatically generates a fourth outbound message 502D indicating the CM server 120 published the story record and that the story is live (i.e., available for the general public to view). The message 504D includes the link to the website generated by the web publishing module 216. The user associated with the profile page 402 can create a new post to appear in the activity stream 410 including the link to easily allow followers of the user to view story.

Figure 6:
FIG. 6 illustrates an example of a digital publication automatically generated by a content management server, according to one embodiment.

FIG. 6 illustrates an example of a digital publication 600 automatically generated by the CM server 120 in response to the example interactions described in FIG. 5. The digital publication 600 includes a plurality of fields, each field including associated text. The digital publication includes a title field 602, an author field 604, a timestamp field 606, and a body field 608, each including the content provided by the user to the CM server 120 solely via the SNS 106.

By enabling the CM server 120 to integrate with existing social media platforms (e.g., an SNS 106), he described embodiments beneficially improve the performance and usability of the content management system 110 by enabling generating of a news story record much more efficiently than using conventional methods. By automatically applying a set of rules to content posted via social media, the content management system 110 can beneficially generate and publish new stories in an intelligent manner without requiring separate direct interaction from a user. Using the embodiments described above, a reporter can beneficially reach both social media audiences and traditional web-based audiences without ever leaving the social media application and without having to navigate between the social media application and a traditional publishing platform. This enables the reporter to quickly and efficiently break a news story both to social media and to a news website.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by the one or more processors, e.g., processor 230, that are temporarily configured (e.g., by software or program code comprised of instructions) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for the embodiments herein through the disclosed principles herein. Thus, while particular embodiments and applications have been illustrated and described, it is to be understood that the disclosed embodiments are not limited to the precise construction and components disclosed herein. Various apparent modifications, changes, and variations may be made in the arrangement, operation and details of the method and apparatus disclosed herein without departing from the spirit and scope defined in the appended claims.

The invention claimed is:

1. A computer-implemented method for automatically publishing a story record to a website, comprising:
    establishing, in a social networking system, a connection between an account associated with a content management server and an authorized user account associated with a publisher;
    monitoring, by the content management server, activity on the social networking system originating from the authorized user account;
    detecting, by the content management server, an original post by the authorized user account to a profile page of the social networking system that contains a text portion and a predefined trigger tag;
    creating the story record in a story database of the content management server responsive to detecting the post containing the predefined trigger tag;
    automatically generating an outbound direct message from the account associated with the content management server to the authorized user account in a private message interface via the social networking system;
    detecting a first inbound direct message from the authorized user account via the social networking system in response to the outbound direct message, the first inbound direct message containing a first field identifier tag and first text associated with the first field identifier tag;
    automatically populating a first field in the story record associated with the first field identifier tag with the first text associated with the first field identifier tag in the first inbound direct message responsive to receiving the first inbound direct message;
    detecting a closing inbound direct message from the authorized user account via the social networking system containing a publish instruction tag; and
    automatically publishing the story record to the website responsive to detecting the publish instruction tag in the closing inbound direct message.

2. The method of claim 1, further comprising:
automatically populating a title field in the story record with the text portion of the original post.

3. The method of claim 1, further comprising:
automatically populating an author field of the story record with a user name associated with the authorized user account.

4. The method of claim 1, further comprising:
detecting a second inbound direct message from the authorized user account, the second inbound direct message containing the first field identifier tag and second text associated with the field identifier tag; and
automatically replacing the first field in the story record associated with the first field identifier tag with the second text.

5. The method of claim 1, further comprising:
detecting a second inbound direct message from the authorized user account, the second inbound direct message containing a predefined layout tag specifying a spatial arrangement for publishing the story record; and
applying the layout to the story record.

6. The method of claim 1, further comprising:
detecting a follow up post from the authorized user account, the follow up post including a second field identifier tag and second text associated with the second field identifier tag; and
automatically populating a second field in the story record associated with the second field identifier tag with the second text.

7. The method of claim 1, further comprising:
detecting a follow up post from the authorized user account, the follow up post including the first field identifier tag and second text associated with the first field identifier tag; and
automatically replacing the first field in the story record associated with the first field identifier tag with the second text.

8. A non-transitory computer-readable storage medium storing instructions for automatically publishing a story record to a website, the instructions when executed causing a processor to perform steps including:

establishing, in a social networking system, a connection between an account associated with a content management server and an authorized user account associated with a publisher;

monitoring activity on the social networking system originating from the authorized user account;

detecting an original post by the authorized user account to a profile page of the social networking system that contains a text portion and a predefined trigger tag;

creating the story record in a story database of the content management server responsive to detecting the post containing the predefined trigger tag;

automatically generating an outbound direct message from the account associated with the content management server to the authorized user account in a private message interface via the social networking system;

detecting a first inbound direct message from the authorized user account via the social networking system in response to the outbound direct message, the first inbound direct message containing a first field identifier tag and first text associated with the first field identifier tag;

automatically populating a first field in the story record associated with the first field identifier tag with the first text associated with the first field identifier tag in the first inbound direct message responsive to receiving the first inbound direct message;

detecting a closing inbound direct message from the authorized user account via the social networking system containing a publish instruction tag; and automatically publishing the story record to the website responsive to detecting the publish instruction tag in the closing inbound direct message.

9. The non-transitory computer-readable storage medium of claim 8, the instructions when executed further causing the processor to perform steps including:

automatically populating a title field in the story record with the text portion of the original post.

10. The non-transitory computer-readable storage medium of claim 8, the instructions when executed further causing the processor to perform steps including:

automatically populating an author field of the story record with a user name associated with the authorized user account.

11. The non-transitory computer-readable storage medium of claim 8, the instructions when executed further causing the processor to perform steps including:

detecting a second inbound direct message from the authorized user account, the second inbound direct message containing the first field identifier tag and second text associated with the field identifier tag; and automatically replacing the first field in the story record associated with the first field identifier tag with the second text.

12. The non-transitory computer-readable storage medium of claim 8, the instructions when executed further causing the processor to perform steps including:

detecting a second inbound direct message from the authorized user account, the second inbound direct message containing a predefined layout tag specifying a spatial arrangement for publishing the story record; and applying the layout to the story record.

13. The non-transitory computer-readable storage medium of claim 8, the instructions when executed further causing the processor to perform steps including:

detecting a follow up post from the authorized user account, the follow up post including a second field identifier tag and second text associated with the second field identifier tag; and automatically populating a second field in the story record associated with the second field identifier tag with the second text.

14. The non-transitory computer-readable storage medium of claim 8, the instructions when executed further causing the processor to perform steps including:

detecting a follow up post from the authorized user account, the follow up post including the first field identifier tag and second text associated with the first field identifier tag; and automatically replacing the first field in the story record associated with the first field identifier tag with the second text.

15. A content management server comprising:

a processor; and a non-transitory computer-readable storage medium storing instructions for automatically publishing a story record to a website, the instructions when executed causing the processor to perform steps including:

establishing, in a social networking system, a connection between an account associated with a content management server and an authorized user account associated with a publisher;

monitoring activity on the social networking system originating from the authorized user account;

detecting an original post by the authorized user account to a profile page of the social networking system that contains a text portion and a predefined trigger tag;

creating the story record in a story database of the content management server responsive to detecting the post containing the predefined trigger tag;

automatically generating an outbound direct message from the account associated with the content management server to the authorized user account in a private message interface via the social networking system;

detecting a first inbound direct message from the authorized user account via the social networking system in response to the outbound direct message, the first inbound direct message containing a first field identifier tag and first text associated with the first field identifier tag;

automatically populating a first field in the story record associated with the first field identifier tag with the first text associated with the first field identifier tag in the first inbound direct message responsive to receiving the first inbound direct message;

detecting a closing inbound direct message from the authorized user account via the social networking system containing a publish instruction tag; and automatically publishing the story record to the website responsive to detecting the publish instruction tag in the closing inbound direct message.

16. The non-transitory computer-readable storage medium of claim 15, the instructions when executed further causing the processor to perform steps including:

automatically populating a title field in the story record with the text portion of the original post.

17. The non-transitory computer-readable storage medium of claim 15, the instructions when executed further causing the processor to perform steps including:

automatically populating an author field of the story record with a user name associated with the authorized user account.

18. The non-transitory computer-readable storage medium of claim 15, the instructions when executed further causing the processor to perform steps including:
   detecting a second inbound direct message from the authorized user account, the second inbound direct message containing the first field identifier tag and second text associated with the field identifier tag; and
   automatically replacing the first field in the story record associated with the first field identifier tag with the second text.

19. The non-transitory computer-readable storage medium of claim 15, the instructions when executed further causing the processor to perform steps including:
   detecting a second inbound direct message from the authorized user account, the second inbound direct message containing a predefined layout tag specifying a spatial arrangement for publishing the story record; and
   applying the layout to the story record.

20. The non-transitory computer-readable storage medium of claim 15, the instructions when executed further causing the processor to perform steps including:
   detecting a follow up post from the authorized user account, the follow up post including a second field identifier tag and second text associated with the second field identifier tag; and
   automatically populating a second field in the story record associated with the second field identifier tag with the second text.

* * * * *